S. F. SMITH.
LEAF SPRING.
APPLICATION FILED NOV. 14, 1913.
1,102,098.
Patented June 30, 1914.
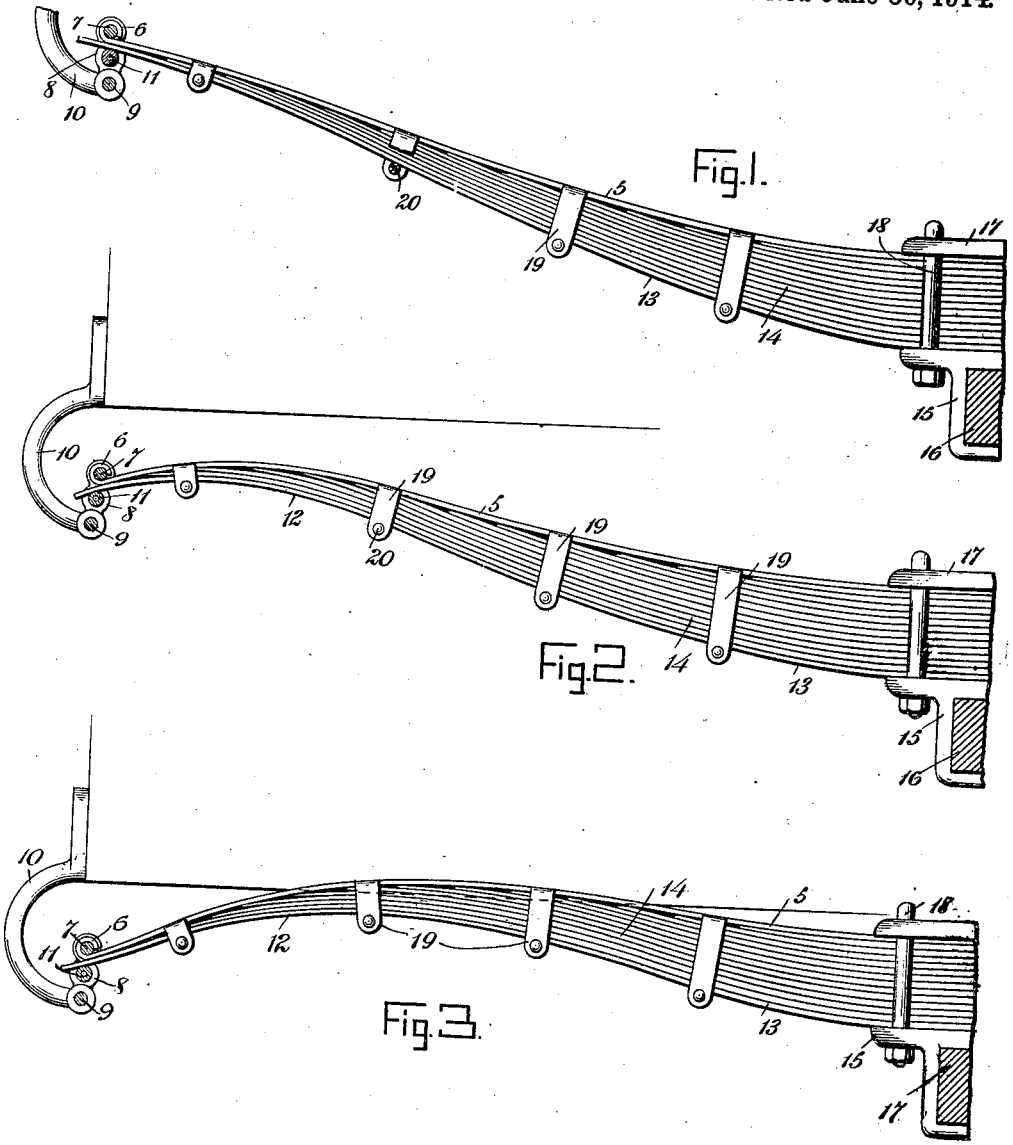
WITNESSES
INVENTOR
Samuel F. Smith
BY
ATTORNEYS

UNITED STATES PATENT OFFICE.

SAMUEL FREDERICK SMITH, OF OAKLAND, CALIFORNIA.

LEAF-SPRING.

1,102,098.

Specification of Letters Patent. Patented June 30, 1914.

Application filed November 14, 1913. Serial No. 800,977.

*To all whom it may concern:*

Be it known that I, SAMUEL F. SMITH, a citizen of the United States, and a resident of Oakland, in the county of Alameda and State of California, have invented a new and Improved Leaf-Spring, of which the following is a full, clear, and exact description.

My invention relates to leaf springs, and has reference more particularly to the provision of the arrangement of the leaves whereby the increase in load on the spring brings into resistance more leaves of the spring.

The object thereof is to provide a simple, inexpensive and flexible leaf spring which automatically responds to slight variation of loads. I obtain the above object by providing a pair of master leaves to which the loads are applied and between which are positioned a series of superimposing leaves gradually varying in length with the longest leaf adjacent the lower portion of the leaf spring and the upper master leaf contacting with the ends of all the leaves positioned between said master leaves. The leaves of varying length between the master leaves are prevented from displacement by means connecting the master leaves at certain intervals.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a side elevation of one end of a leaf spring as used on vehicles embodying my invention. Fig. 2 is a similar view showing the same under a medium load; and Fig. 3 shows the same under a large load.

Referring to the drawings, the upper master leaf 5 is provided at its extremities with tubular portions 6 integral therewith engaging a pin 7 carried by links 8 and positioned on each side of the tubular portion 6. The opposite ends of the links 8 are engaged by a pin 9 bearing in a bracket 10, which is adapted to be secured to a vehicle and wherethrough the load of the vehicle is transmitted to the spring. Positioned intermediate each pair of links 8 is a roller 11 which is parallel to the pins and intermediate the same. The end 12 of the lower master leaf 13 contacts with the roller and also with the end of the upper master leaf 5. That is to say, the distance between the pin 7 and the roller 11 is substantially equal to the thickness of the two master leaves, and when the load is applied to said master leaves through the medium of the bracket, the upper master leaf acts on the lower one which rolls on the member 11.

Positioned intermediate the upper and lower master leaves is a series of superposing leaves 14 varying gradually in length, the longest being in contact with the lower master leaf and the shortest in contact with the upper master leaf; the intermediate leaves having their ends in contact with the upper master leaf. The leaves of varying length positioned intermediate the master leaves form therewith a spring of uniform strength, that is to say, the cross section of such a spring increases toward the support of the spring. As shown in the drawing, the support of the spring is formed by a yoke 15 secured to the axle of the vehicle 16 and having a flat surface adapted to receive the central portion of the lower master leaf. A plate 17, engaging the upper master leaf of the central portion, is secured to the yoke by means of bolts 18, whereby the central portion of the spring is firmly secured to the yoke 15 and, therefore, to the axle. The upper and lower master leaves of the spring are maintained in proper relation by means of yokes 19 carried by the upper master leaf 5. The lower master leaf contacts with the rollers 20 provided in the yokes and reduces the friction when the spring is under the action of a load. When a load is applied to the spring through the brackets 10, it acts on the upper master leaf 5, which, by contacting with the lower master leaf 13 affects the same. That is to say, any load transmitted to the upper master leaf is transmitted also to the lower master leaf. The leaves of different length positioned intermediate the master leaves, as previously stated, have their ends in contact with the upper master leaf, and, consequently, when there is an increase in load the deflection of the master leaves is resisted by the ends of the leaves engaging the upper master leaves. Consequently, when a larger load is applied to the spring more of the intermediate springs are engaged by the upper master leaf, and, therefore, more leaves are resisting the load, as can be seen from the figures in the drawing.

Having thus described my invention, I claim as new and desire to secure by Letters Patent:

1. In a leaf spring,—a pair of superposing master leaves; links pivotally secured to the extremities of the upper master leaf; rolling elements in said links engaging the lower master leaf; brackets associated with said links wherethrough a load is transmitted to said master leaves; a plurality of superposing leaves of different length positioned between said master leaves, with their length decreasing from the lower master leaf to the upper one, each of said leaves of the superposing series having its ends contacting with the upper master leaf; and means connected to the upper master leaf and preventing the displacement of the series of leaves therebetween.

2. In a leaf spring,—a pair of superposing master leaves, said upper leaf having means whereby the spring can be secured; a plurality of superposing leaves of different length positioned between said master leaves, each of said superposing leaves contacting with its extremities with the upper master leaf; and means securing all of said leaves together, including rolling elements engaged by said lower master leaf.

3. In a leaf spring,—a pair of superposing master leaves, the upper leaf having means whereby the spring can be secured; a plurality of superposing leaves of different lengths positioned between said master leaves with their length decreasing from the lower master leaf to the upper one, each of said leaves of different length having its extremities in contact with the upper master leaf; and means securing all of said leaves together, said last mentioned means having rollers engaging the lower master leaf on which the same is free to move.

In testimony whereof I have signed my name to this specification in the presence of two subscribing witnesses.

SAMUEL FREDERICK SMITH.

Witnesses:
E. WUISMITH,
P. B. MITCHENER.

---

Copies of this patent may be obtained for five cents each, by addressing the "Commissioner of Patents, Washington, D. C."